United States Patent
Takeyama et al.

(10) Patent No.: US 10,593,969 B2
(45) Date of Patent: Mar. 17, 2020

(54) FUEL CELL VEHICLE

(71) Applicant: TOYOTA JIDOSHA KABUSHIKI KAISHA, Toyota-shi, Aichi-ken (JP)

(72) Inventors: Makoto Takeyama, Toyota (JP); Tomoyuki Kozuka, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/992,534

(22) Filed: May 30, 2018

(65) Prior Publication Data
US 2018/0358637 A1 Dec. 13, 2018

(30) Foreign Application Priority Data
Jun. 8, 2017 (JP) ................. 2017-113276

(51) Int. Cl.
H01M 8/04082 (2016.01)
H01M 8/04119 (2016.01)
H01M 8/2457 (2016.01)
H01M 8/2465 (2016.01)
B60L 1/00 (2006.01)
H01M 8/04089 (2016.01)
(Continued)

(52) U.S. Cl.
CPC ......... H01M 8/04164 (2013.01); B60L 1/003 (2013.01); B60L 3/0007 (2013.01); B60L 50/71 (2019.02); B60L 50/72 (2019.02); H01M 8/04097 (2013.01); H01M 8/04201 (2013.01); H01M 8/2457 (2016.02); H01M 8/2465 (2013.01); B01D 45/06 (2013.01); H01M 2250/20 (2013.01)

(58) Field of Classification Search
None
See application file for complete search history.

(56) References Cited

U.S. PATENT DOCUMENTS

2003/0108784 A1* 6/2003 Enjoji ............... H01M 8/02
429/434
2010/0112404 A1* 5/2010 Yamagishi ........ H01M 8/04007
429/469
(Continued)

FOREIGN PATENT DOCUMENTS

JP 2008-66087 A 3/2008
JP 2014-123457 A 7/2014
JP 2015-231319 A 12/2015

Primary Examiner — Haroon S. Sheikh
(74) Attorney, Agent, or Firm — Dickinson Wright PLLC

(57) ABSTRACT

A fuel cell vehicle has a front compartment accommodating a hydrogen pump provided to a pipe through which fuel gas is supplied, and a gas-liquid separator that is fastened to the hydrogen pump and removes water from the fuel gas flowing through the pipe, the gas-liquid separator having an end portion on a backward side in a travelling direction arranged more on the backward side than an end portion of the hydrogen pump on the backward side in the travelling direction. A fastening portion, at which the hydrogen pump and the gas-liquid separator are fastened to each other, has a center of gravity $C_{GLS}$ shifted from a center of gravity $C_{HP}$ of the hydrogen pump in a width direction of the fuel cell vehicle, in the fuel cell vehicle as viewed in a vertical direction.

6 Claims, 10 Drawing Sheets

(51) Int. Cl.
B60L 50/72 (2019.01)
B60L 50/71 (2019.01)
B60L 3/00 (2019.01)
B01D 45/06 (2006.01)

(56) References Cited

U.S. PATENT DOCUMENTS

| | | |
|---|---|---|
| 2010/0183939 A1 | 7/2010 | Sekine et al. |
| 2011/0091782 A1* | 4/2011 | Itoga ................ H01M 8/04164 429/414 |
| 2012/0006606 A1* | 1/2012 | Masaki .................... B60K 1/04 180/65.31 |
| 2015/0244006 A1* | 8/2015 | Yoshitomi ........... H01M 8/2475 429/446 |
| 2017/0096172 A1 | 4/2017 | Nagaosa |

* cited by examiner

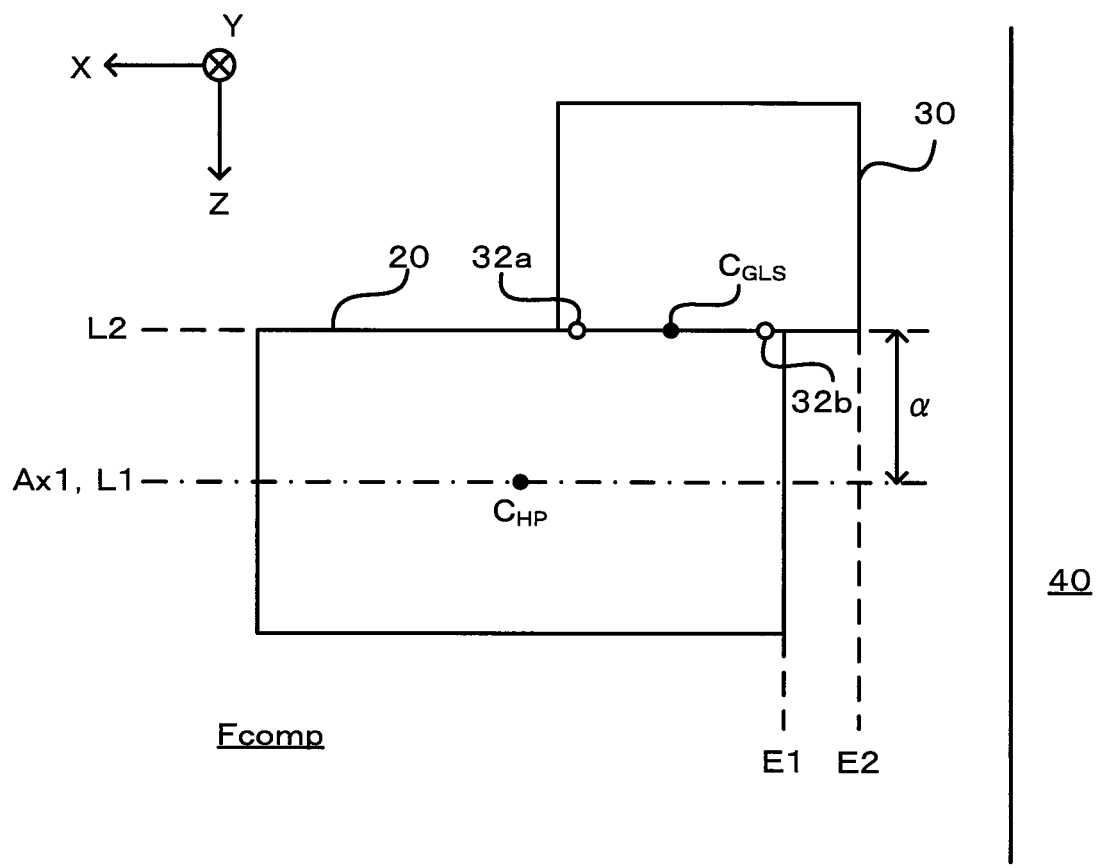

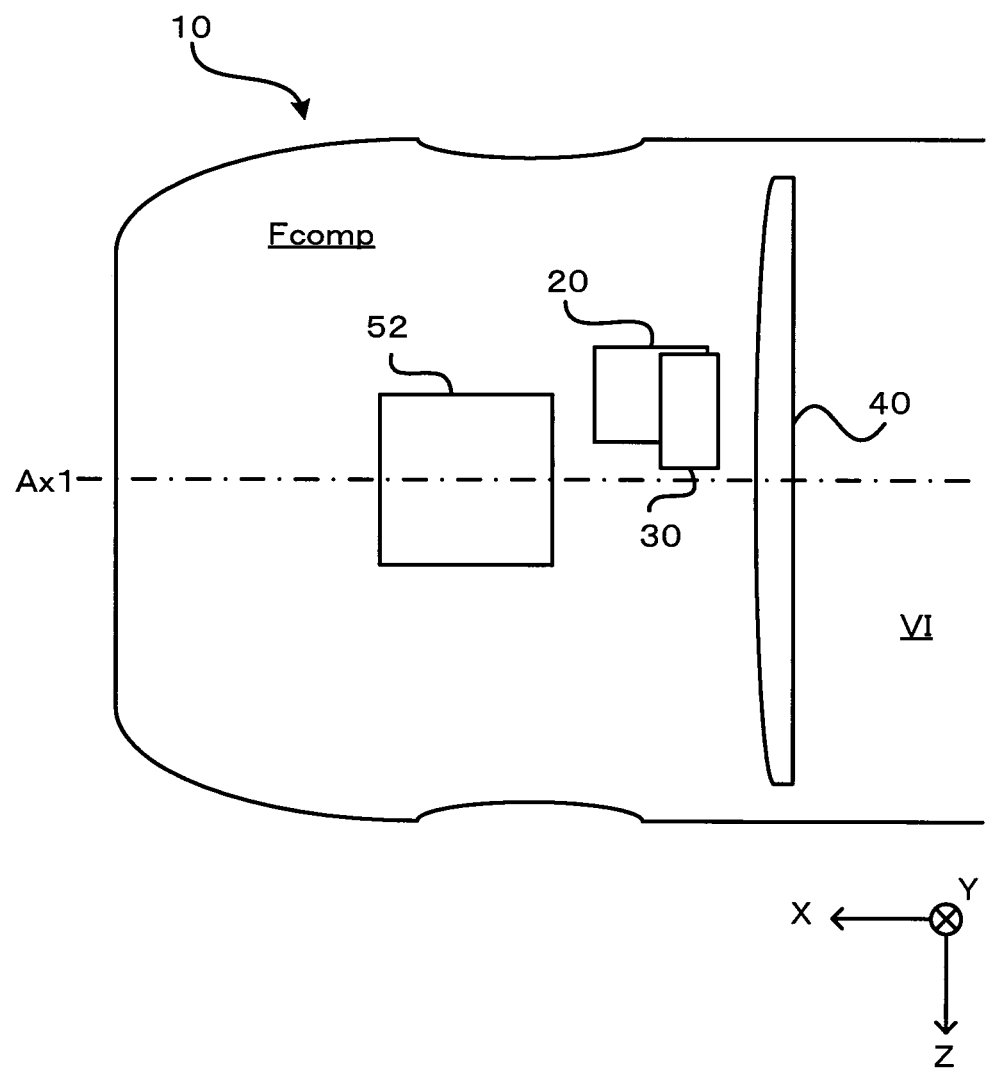

FUEL CELL VEHICLE

CROSS-REFERENCE TO RELATED APPLICATION

The present application claims priority to Japanese Patent Application No. 2017-113276 filed on Jun. 8, 2017, the entirety of the content of which is hereby incorporated by reference into this application.

BACKGROUND

Field

The present disclosure relates to a fuel cell vehicle including a fuel cell.

Related Art

Known fuel cell vehicles including a fuel cell include a fuel cell vehicle that uses hydrogen gas as fuel gas to be supplied to the fuel cell (for example, JP 2015-231319A).

For example, such a fuel cell vehicle has a hydrogen pump provided to a pipe for supplying the hydrogen gas to an anode of a fuel cell. Generally, the hydrogen pump has high strength. Specifically, a motor and a rotor, with relatively heavy weight, are accommodated in a metal casing with relatively high rigidity for example. The hydrogen pump may be provided in a front compartment of the fuel cell vehicle. In such a configuration, the hydrogen pump might collide with a dash panel defining a rear surface of the front compartment to deform the dash panel, when the vehicle collides to have a front portion deformed. Thus, the fuel cell vehicle, with the front compartment accommodating the hydrogen pump, has been desired to have a configuration capable of preventing the dash panel from deforming due to vehicle collision.

SUMMARY

In an aspect of the technique disclosed herein, there is provided a fuel cell vehicle equipped with a fuel cell. The fuel cell vehicle comprises a hydrogen pump provided to a pipe through which fuel gas including hydrogen is supplied to an anode of the fuel cell in a front compartment separated from a cabin by a dash panel; and a gas-liquid separator configured to be fastened to the hydrogen pump and remove water from the fuel gas flowing through the pipe, the gas-liquid separator having an end portion on a backward side in a travelling direction of the fuel cell vehicle arranged more on the backward side than an end portion of the hydrogen pump on the backward side in the travelling direction in the front compartment. A fastening portion, at which the hydrogen pump and the gas-liquid separator are fastened to each other, has a center of gravity shifted from a center of gravity of the hydrogen pump in a width direction of the fuel cell vehicle, in the fuel cell vehicle as viewed in a vertical direction.

BRIEF DESCRIPTION OF DRAWINGS

FIG. 6 is a diagram illustrating positional relationship between the center of gravity of the fastening portion and the center of gravity of the hydrogen pump;

FIG. 9 is an inner view of the front compartment as viewed from the lower side.

DETAILED DESCRIPTION

A. First Embodiment

A fuel cell vehicle according to a first embodiment of the present disclosure includes a fuel cell system 60 including a fuel cell 50. The fuel cell vehicle according to the first embodiment has a front compartment incorporating at least a part of devices forming the fuel cell system 60. The front compartment is a space in front of a cabin in the fuel cell vehicle. A dash panel partitions the cabin and the front compartment. In the description below, the fuel cell system 60 is described before the arrangement in the front compartment is described.

Figure 1:
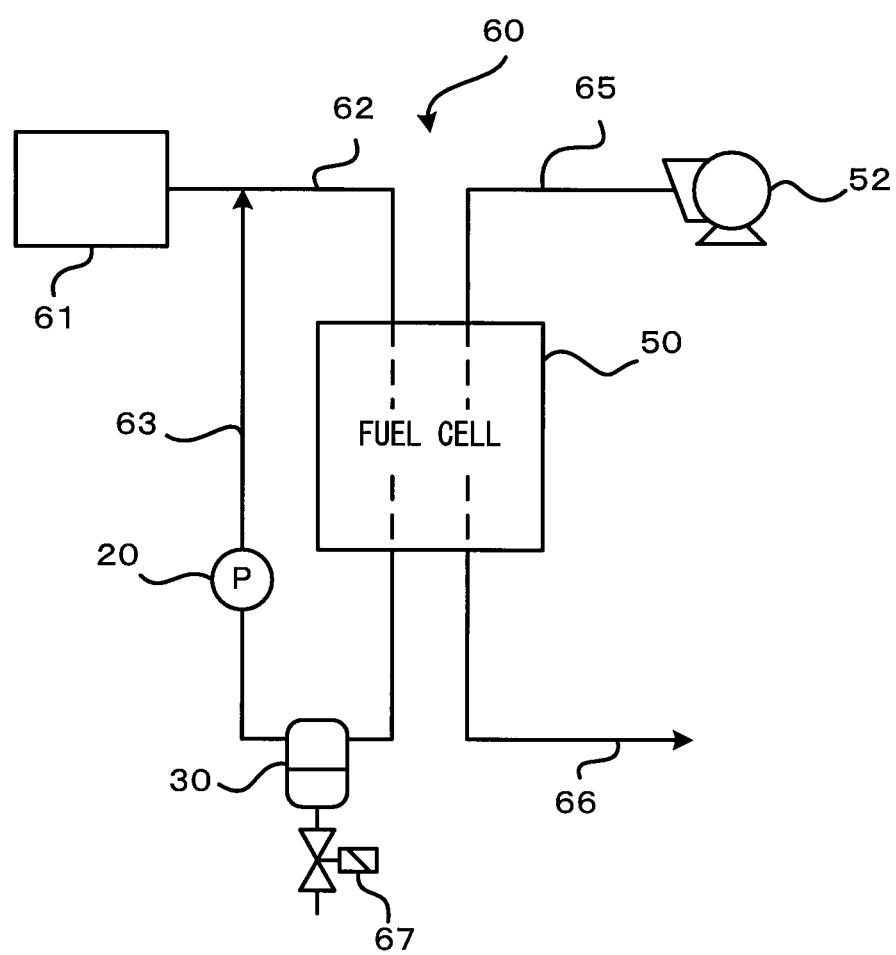
FIG. 1 is a diagram illustrating a schematic configuration of a fuel cell system.

FIG. 1 is a diagram illustrating a schematic configuration of the fuel cell system 60 included in the fuel cell vehicle according to the present embodiment. Specifically, a schematic configuration related to supplying and discharging of gas to and from the fuel cell 50 is illustrated.

The fuel cell system 60 includes the fuel cell 50, a fuel gas supplying unit 61, and an air compressor 52. The fuel cell 50, which may be of various types, is a solid polymer fuel cell in the present embodiment. The fuel cell 50 has a stack structure with a plurality of unit cells stacked. The unit cells each include a Membrane Electrode Assembly (MEA) including an electrolyte membrane as well as an anode and a cathode that are electrodes formed on different surfaces of the electrolyte membrane.

The fuel gas supplying unit 61 stores fuel gas, including hydrogen, to be supplied to the fuel cell 50. For example, the fuel gas supplying unit 61 may include a hydrogen tank that stores compressed hydrogen and a hydrogen tank incorporating a hydrogen absorbing alloy. The hydrogen gas stored in the fuel gas supplying unit 61 is supplied to the anode of the fuel cell 50 through a fuel gas supplying path 62. Anode off gas discharged from the anode is guided to an anode off gas path 63 to flow into the fuel gas supplying path 62 again. In this manner, hydrogen gas remaining in the anode off gas circulates in the flow path to be reused for electrochemical reaction. Thus, a part of the fuel gas supplying path 62, a fuel gas flow path in the fuel cell 50, and the anode off gas path 63 form a fuel gas circulating flow path. As described above, gas flowing in the circulating flow path includes the hydrogen gas supplied from the fuel gas supplying unit 61 and the anode off gas. The gas flowing in the circulating flow path is hereinafter, simply referred to as fuel gas.

The anode off gas path 63 is provided with a gas-liquid separator 30 that removes water from the fuel gas circulating in the circulating flow path. A flow path, though which the water separated by the gas-liquid separator 30 is discharged outside, is provided with an on-off valve 67. The on-off valve 67 is opened at a predetermined timing so that impurities (for example, water vapor and nitrogen) other than hydrogen, in the fuel gas circulating in the flow path, may be discharged from the flow path. This suppresses an increase in concentration of the impurities included in the fuel gas supplied to the fuel cell 50. The anode off gas path 63 is provided with a hydrogen pump 20. The hydrogen pump 20 generates driving force for circulating the fuel gas in the fuel gas circulating flow path described above.

The air compressor 52 supplies pressurized air, serving as oxidizing gas, to the cathode of the fuel cell 50 through an oxidizing gas supply path 65. Cathode exhaust gas, discharged from the cathode of the fuel cell 50, is guided to a cathode exhaust gas path 66 to be discharged to the outside. The fuel gas supplying path 62 or the oxidizing gas supply path 65 may further be provided with a humidifier that humidifies the fuel gas or the oxidizing gas.

Figure 2:
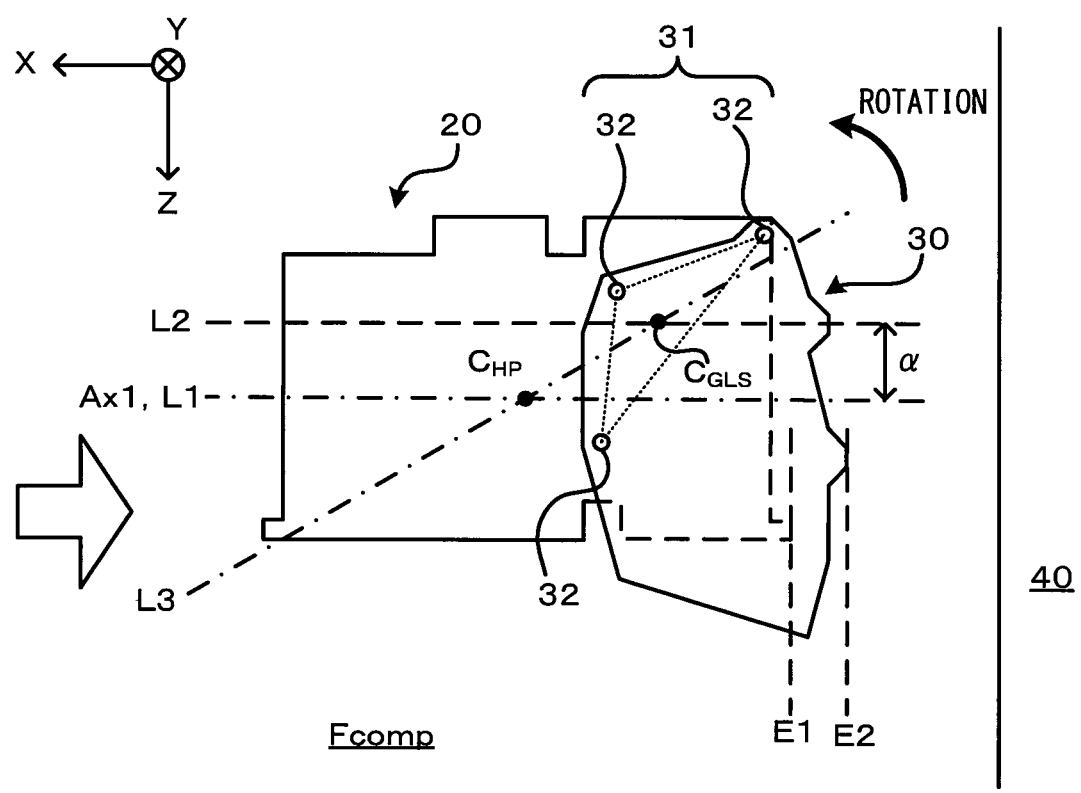
FIG. 2 is a diagram illustrating positional relationship between a hydrogen pump and a gas-liquid separator.

FIG. 2 is a diagram illustrating positional relationship between the hydrogen pump 20 and the gas-liquid separator 30, in the front compartment (Fcomp) of the fuel cell vehicle according to the present embodiment. The front compartment accommodates various devices. Still, only the hydrogen pump 20 and the gas-liquid separator 30 are illustrated in FIG. 2, and other devices are omitted in the figure.

FIG. 2 illustrates X, Y, and Z axes that are orthogonal to each other. A +X direction indicates a forward travelling direction of the vehicle, and a −X direction indicates a backward travelling direction of the vehicle. A +Z direction indicates a right side direction of the vehicle, and a −Z direction indicates a left side direction of the vehicle. Thus, an X direction corresponds to a "forward and backward direction of the vehicle". A Z direction corresponds to a "width direction of the vehicle" or a "left and right direction". A +Y direction indicates an upper side in a vertical direction (hereinafter, also simply referred to as an upper side) and a −Y direction indicates a lower side in the vertical direction (hereinafter, also simply referred to as a lower side). Thus, FIG. 2 illustrates the fuel cell vehicle according to the present embodiment as viewed from the lower side in the vertical direction. These directions similarly apply to FIG. 4 to FIG. 9 described later.

In the present embodiment, no device is between a dash panel 40 and the hydrogen pump 20 or between the dash panel 40 and the gas-liquid separator 30. The dash panel 40 defines a rear side surface (−X direction surface) of the front compartment. Thus, the hydrogen pump 20 and the gas-liquid separator 30 are disposed directly in front of the dash panel 40 with no device between the dash panel 40 and the hydrogen pump 20 or between the dash panel 40 and the gas-liquid separator 30.

As illustrated in FIG. 2, the gas-liquid separator 30 is disposed below the hydrogen pump 20 in the front compartment. The gas-liquid separator 30 is directly fastened to the hydrogen pump 20 with a bolt or the like. With the gas-liquid separator 30 and the hydrogen pump 20 arranged close to each other while being directly fastened to each other as described above, the length of a pipe between the gas-liquid separator 30 and the hydrogen pump 20 may be set to be short. As a result, the fuel gas that has passed through the gas-liquid separator 30 may be prevented from having the amount of water therein increased again before reaching the hydrogen pump 20. Thus, an attempt to reduce the amount of water in the fuel gas supplied to the hydrogen pump 20 may be facilitated. The water in the fuel gas supplied to the hydrogen pump 20 might be a cause of problems such as strange noise produced due to the water in the hydrogen pump 20, mechanical failure of the hydrogen pump 20 due to the water, the water serving as resistance in the hydrogen pump 20, and the water resulting in rust in the hydrogen pump 20. These problems may be prevented or mediated with the gas-liquid separator 30 arranged close to and on an upstream side of the hydrogen pump 20.

As illustrated in FIG. 2, in the present embodiment, the hydrogen pump 20 and the gas-liquid separator 30 are fastened to each other at three fastening positions 32. All of the fastening positions 32 are also collectively referred to as a fastening portion 31. In FIG. 2, a center of gravity $C_{GLS}$ represents the center of gravity of the fastening portion 31 at which the hydrogen pump 20 and the gas-liquid separator 30 are fastened to each other, and a center of gravity $C_{HP}$ represents the center of gravity of the hydrogen pump 20. The center of gravity $C_{GLS}$ of the fastening portion 31 is the center of gravity of a triangle obtained by connecting the three fastening positions 32 in the fuel cell vehicle as viewed from the lower side in the vertical direction.

Figure 3:
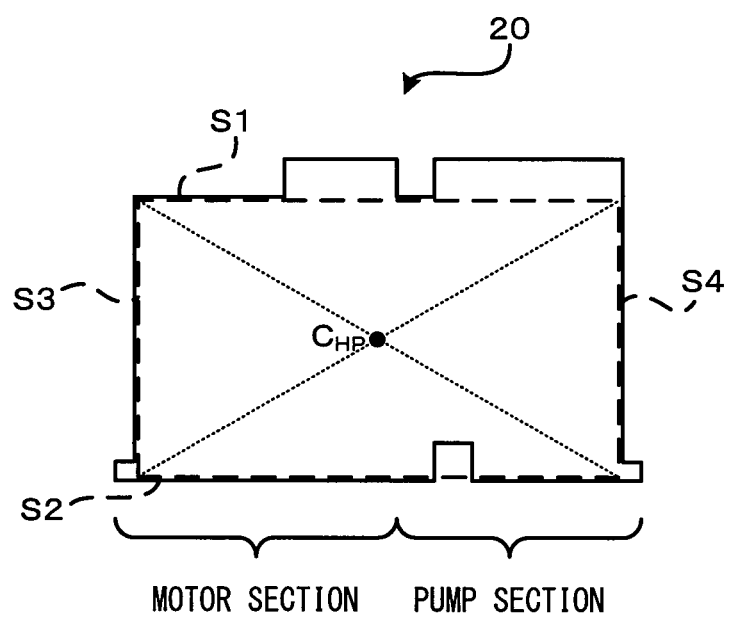
FIG. 3 is a diagram illustrating a position of the center of gravity of the hydrogen pump.

FIG. 3 is a diagram illustrating the position of the center of gravity $C_{HP}$ of the hydrogen pump 20 in the fuel cell vehicle according to the present embodiment as viewed from the lower side in the vertical direction. The center of gravity $C_{HP}$ of the hydrogen pump 20 is the geometrical center of gravity of a shape of the outer appearance of the hydrogen pump 20 (hereinafter, also simply referred to as an outer shape of the hydrogen pump 20) in the fuel cell vehicle as viewed in the vertical direction. Generally, the hydrogen pump 20 is provided with portions for electrically connecting with a unit outside the hydrogen pump 20 and for attaching the hydrogen pump 20, and thus has a surface provided with a plurality of recesses and protrusions. The center of gravity $C_{HP}$ of the hydrogen pump 20 having the recesses and protrusions may be identified with the outer shape of the hydrogen pump 20 approximated to a rectangle in the fuel cell vehicle as viewed in the vertical direction.

As illustrated in FIG. 3, the hydrogen pump 20 includes a pump section including a rotor and a motor section including a motor. The motor section has a substantially cylindrical outer shape corresponding to the shape of the motor. The outer shape of the hydrogen pump 20 is approximated to a rectangle as follows. First of all, sides S1 and S2 of the outer shape of the motor section are identified. These sides S1 and S2 are defined by two straight lines that face each other while extending in parallel with a rotation axis of the motor. Then, a side S3 of the outer shape of the motor section is identified. The side S3 is orthogonal to the sides S1 and S2 and overlaps with an end portion of the motor section on the side opposite to the pump section. Then, a side S4 is identified. The side S4 of the outer shape of the motor section is orthogonal to the sides S1 and S2 and overlaps with an end portion of the pump section on the side opposite to the motor section. The center of gravity of a rectangle defined by the sides S1 to S4 thus identified (intersection between diagonal lines of the rectangle) may be identified as the center of gravity $C_{HP}$ of the hydrogen pump 20.

A feature of the fuel cell vehicle according to the present embodiment lies in the positional relationship between the hydrogen pump 20 and the gas-liquid separator 30. Specifically, the center of gravity $C_{GLS}$ of the fastening portion 31, at which the hydrogen pump 20 and the gas-liquid separator 30 are fastened to each other, is shifted from the center of gravity $C_{HP}$ of the hydrogen pump 20 in the width direction of the fuel cell vehicle, in the fuel cell vehicle as viewed in the vertical direction. In the following description, a state of the fuel cell vehicle as viewed from the lower side in the vertical direction (in the +Y direction) is described with reference to FIG. 2. Note that the described relationship similarly applies to a state of the fuel cell vehicle as viewed from the upper side in the vertical direction (in the −Y direction).

In FIG. 2, a straight line extending in parallel with the travelling direction of the fuel cell vehicle while passing through the center of gravity $C_{HP}$ of the hydrogen pump 20 is illustrated as a straight line L1. A straight line extending in parallel with the rotation axis of the motor of the hydrogen pump 20 while passing through the center of gravity $C_{HP}$ of the hydrogen pump 20 is illustrated as a center line Ax1. In the hydrogen pump 20 according to the present embodiment, the straight line L1 and the center line Ax1 match. A straight line extending in parallel with the travelling direction of the fuel cell vehicle while passing through the center of gravity $C_{GLS}$ of the fastening portion 31 is illustrated as a straight line L2. The straight line L2 is shifted from the straight line L1 in the width direction of the fuel cell vehicle (toward the left side of the vehicle). Thus, in the present embodiment, the center of gravity $C_{GLS}$ of the fastening portion 31 is shifted from the center of gravity $C_{HP}$ of the hydrogen pump 20 in the width direction of the fuel cell vehicle, in the fuel cell vehicle as viewed from the lower side in the vertical direction. In FIG. 2, a distance a represents a distance between the straight line L1 and the straight line L2, that is, between the center of gravity $C_{HP}$ of the hydrogen pump 20 and the center of gravity $C_{GLS}$ of the fastening portion 31, in the width direction of the fuel cell vehicle.

In FIG. 2, the fastening portion 31 includes the three fastening positions 32. Alternatively, the number of fastening positions 32 may be one, two, or may be equal to or larger than four. In these configurations, the position of the center of gravity $C_{GLS}$ of the fastening portion 31, in the fuel cell vehicle as viewed from the lower side in the vertical direction, is identified as follows. When the number of the fastening positions 32 is one, the center of gravity $C_{GLS}$ of the fastening portion 31 is the position of the fastening position 32. When the number of the fastening positions 32 is two, the center of gravity $C_{GLS}$ of the fastening portion 31 is at the center of a line connecting the two fastening positions 32. When the number of the fastening positions 32 is equal to or larger than four, the center of gravity $C_{GLS}$ of the fastening portion 31 is the center of gravity of a figure (polygonal shape) obtained by connecting all the fastening positions 32. Thus, the center of gravity $C_{GLS}$ of the fastening portion 31 including a plurality of the fastening positions 32 is the center of gravity of a figure obtained by connecting the plurality of fastening positions 32, in the fuel cell vehicle as viewed in the vertical direction. It suffices if the center of gravity $C_{GLS}$ of the fastening portion 31 is shifted from the center of gravity $C_{HP}$ of the hydrogen pump 20 in the width direction of the fuel cell vehicle. The number of the fastening positions 32 may be three or more so that the hydrogen pump 20 and the gas-liquid separator 30 may be stably fastened to each other with sufficient fastening strength ensured.

In FIG. 2, a straight line that extends to be orthogonal to the travelling direction of the fuel cell vehicle while passing through a rear end of the hydrogen pump 20 is illustrated as a straight line E1. A straight line that extends to be orthogonal to the travelling direction of the fuel cell vehicle while passing through a rear end of the gas-liquid separator 30 is illustrated as a straight line E2. Thus, the gas-liquid separator 30 is arranged to have an end portion, on the backward side in the travelling direction of the vehicle, disposed more on the backward side than an end portion of the hydrogen pump 20 on the backward side in the travelling direction (the straight line E2 is disposed more on the backward side than the straight line E1).

Frontal collision of the fuel cell vehicle according to the present embodiment with the configuration described above results in a collision load, in a direction from the forward side to the backward side, applied to the components of the fuel cell vehicle. In FIG. 2, a white arrow represents the direction of the collision load. For example, when this collision load is applied, the front portion of the fuel cell vehicle deforms, and the devices in the front compartment move toward the backward side, that is, move in the −X direction. As a result, the hydrogen pump 20, moving toward the backward side, might collide with the dash panel 40. As described above, the hydrogen pump 20 includes components such as the motor, with relatively heavy weight, accommodated in the metal casing with relatively high rigidity. Thus, the hydrogen pump 20 as a whole is relatively heavy. Thus, the dash panel 40 deforms when colliding with the hydrogen pump 20.

In the present embodiment, the gas-liquid separator 30 is directly fastened to the hydrogen pump 20, and thus is kept in a normally fastened state to integrally move with the hydrogen pump 20, when the collision load is applied to move the hydrogen pump 20 toward the backward side. The gas-liquid separator 30 has the end portion on the backward side in the travelling direction of the vehicle arranged more on the backward side than the end portion of the hydrogen pump 20 on the backward side in the travelling direction. Thus, when the vehicle collides, the gas-liquid separator 30 collides with the dash panel 40 before the hydrogen pump 20 collides.

The gas-liquid separator 30 does not include the motor, which is a relatively heavy rotor included in the hydrogen pump 20, and thus is not required to have a casing that is as rigid as the casing of the hydrogen pump 20. Thus, the gas-liquid separator 30 has a resin casing so as not to have a large total weight. The amount of the deformation of the dash panel 40 is smaller in the case of the collision with the gas-liquid separator 30 that is relatively light than in the case where the hydrogen pump 20 collides.

When the gas-liquid separator 30 collides with the dash panel 40, reaction in the direction opposite to that of the collision load is produced. This reaction is transmitted to the hydrogen pump 20, integrated with the gas-liquid separator 30, through the gas-liquid separator 30. As described above, the center of gravity $C_{GLS}$ of the fastening portion 31 is shifted from the center of gravity $C_{HP}$ of the hydrogen pump 20 in the width direction of the fuel cell vehicle. Thus, the reaction transmitted to the hydrogen pump 20 results in force for rotating the hydrogen pump 20 produced in the hydrogen pump 20.

In FIG. 2, a straight line between the center of gravity $C_{GLS}$ of the fastening portion 31 and the center of gravity $C_{HP}$ of the hydrogen pump 20 is illustrated as a straight line L3. When the collision load, in the backward travelling direction indicated by the white arrow, is applied to the hydrogen pump 20, the reaction in the opposite direction is also applied to the hydrogen pump 20. As a result, rotational force, in a direction indicated by an arrow in FIG. 2, is produced in the hydrogen pump 20. Specifically, this force makes the hydrogen pump 20 rotate in such a direction that the inclination of the center line Ax1 of the hydrogen pump 20 becomes close to the inclination of the straight line L3, in the fuel cell vehicle as viewed from the lower side in the vertical direction. When the hydrogen pump 20 rotates in the direction as indicated by the arrow in FIG. 2 due to this force, the direction in which the hydrogen pump 20 moves in the backward travelling direction changes.

In the fuel cell vehicle according to the present embodiment having the configuration described above, the gas-liquid separator 30 is fastened to the hydrogen pump 20, to have the end portion on the backward side in the travelling direction disposed more on the backward side than the end portion of the hydrogen pump 20 on the backward side in the travelling direction, in the front compartment. The center of gravity $C_{GLS}$ of the fastening portion 31, at which the hydrogen pump 20 and the gas-liquid separator 30 are fastened to each other, is shifted from the center of gravity of the hydrogen pump 20 in the width direction of the fuel cell vehicle, in the fuel cell vehicle as viewed in the vertical direction. Thus, when the fuel cell vehicle collides to cause movement of the hydrogen pump 20 and the gas-liquid separator 30 toward the dash panel 40 resulting in the collision between the gas-liquid separator 30 and dash panel 40, the hydrogen pump 20 rotates to have the movement direction changed. Thus, the hydrogen pump 20 may be prevented from colliding with the dash panel 40 or collides with the dash panel 40 with smaller impact on the dash panel 40. All things considered, the deformation of the dash panel 40 due to the collision between the hydrogen pump 20 and the dash panel 40 may be prevented or reduced.

B. Second Embodiment

Figure 4:
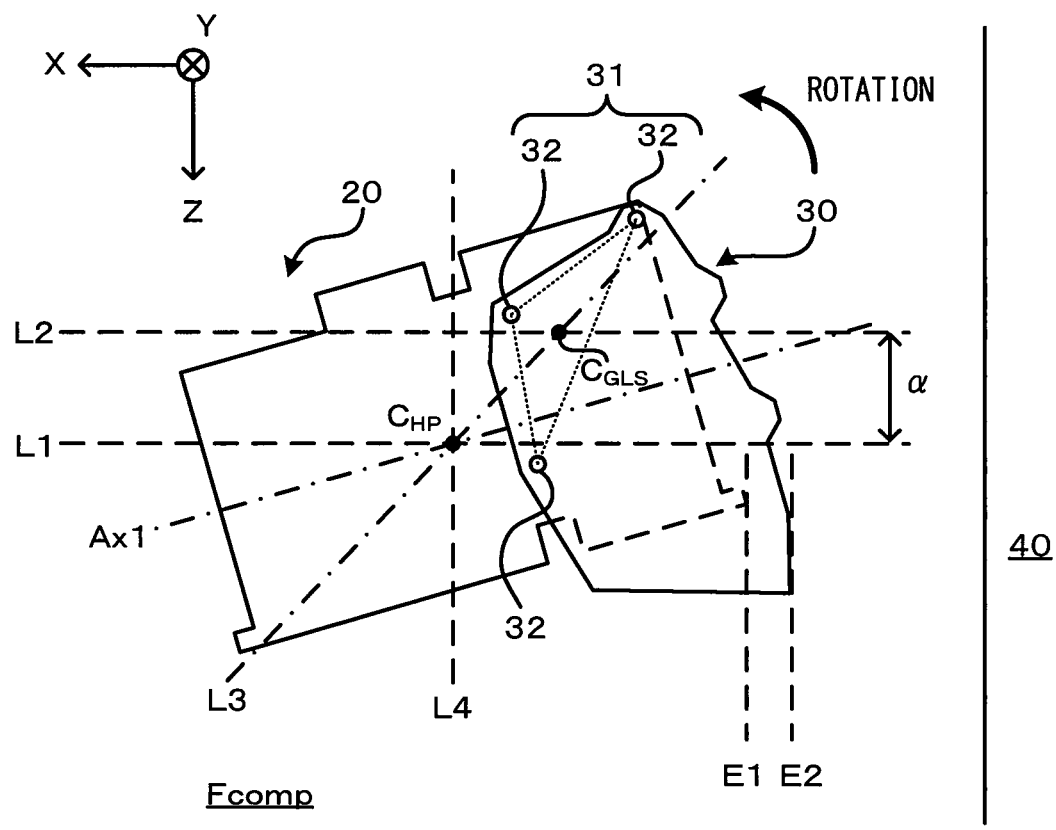
FIG. 4 is a diagram illustrating positional relationship between the hydrogen pump and the gas-liquid separator.

FIG. 4 is a diagram illustrating positional relationship between the hydrogen pump 20 and the gas-liquid separator 30 in the front compartment (Fcomp) in a fuel cell vehicle according to a second embodiment as viewed from the lower side in the vertical direction, as in FIG. 2. The fuel cell vehicle according to the second embodiment has a configuration similar to that of the fuel cell vehicle according to the first embodiment, but is different from that of the fuel cell vehicle according to the first embodiment in how the hydrogen pump 20 is orientated. Thus, components that are the same as those in the first embodiment are denoted with the same reference numerals, and will not be elaborated upon here.

As illustrated in FIG. 4, in the second embodiment, the gas-liquid separator 30 is arranged to have the end portion, on the backward side in the travelling direction of the vehicle, disposed more on the backward side than the end portion of the hydrogen pump 20 on the backward side in the travelling direction (the straight line E2 is disposed more on the backward side than the straight line E1), as in the first embodiment. The center of gravity $C_{GLS}$ of the fastening portion 31, at which the hydrogen pump 20 and the gas-liquid separator 30 are fastened to each other, is shifted from the center of gravity of the hydrogen pump 20 in the width direction of the fuel cell vehicle, in the fuel cell vehicle as viewed in the vertical direction.

In the second embodiment, the center line Ax1 of the hydrogen pump 20 is inclined relative to the X direction. Specifically, the hydrogen pump 20 is arranged in such a manner that the rotation axis of the motor of the hydrogen pump 20 is inclined relative to the travelling direction of the vehicle, in the fuel cell vehicle as viewed from the lower side in the vertical direction.

The straight line L3 between the center of gravity $C_{GLS}$ of the fastening portion 31 and the center of gravity $C_{HP}$ of the hydrogen pump 20 and the rotation axis (the center line Ax1 of the hydrogen pump 20) of the motor of the hydrogen pump 20 are inclined toward the same side relative to the travelling direction, in the fuel cell vehicle according to the present embodiment as viewed in the vertical direction. More specifically, the center line Ax1 and the straight line L3 pass through the same quadrants (for example, the first and the third quadrants in the present embodiment) in a plane defined by the straight line L1 serving as an x axis and a straight line L4 serving as a y axis. The straight line L1 extends in parallel with the travelling direction of the vehicle while passing through the center of gravity $C_{HP}$ of the hydrogen pump 20 (the −X direction that is the backward travelling direction serves as a positive direction). The straight line L4 extends to be orthogonal to the travelling direction of the vehicle while passing through the center of gravity $C_{HP}$ of the hydrogen pump 20 (the −Z direction that is the left side direction of the vehicle serves as the positive direction).

With the fuel cell vehicle according to the second embodiment having the configuration described above, the advantageous effect that is the same as that in the first embodiment may be achieved. Furthermore, the hydrogen pump 20 may be more effectively rotated when the fuel cell vehicle collides, due to the reason described below.

In the second embodiment, the center line Ax1 of the hydrogen pump 20 and the straight line L3 between the center of gravity $C_{GLS}$ of the fastening portion 31 and the center of gravity $C_{HP}$ of the hydrogen pump 20 are inclined toward the same side relative to the travelling direction, in the fuel cell vehicle as viewed in the vertical direction. The hydrogen pump 20 with the center line Ax1 inclined relative to the travelling direction is likely to rotate in the direction in which the center line Ax1 of the hydrogen pump 20 is inclined relative to the travelling direction when the vehicle collides. Thus, in the present embodiment, the direction in which the hydrogen pump 20 is likely to rotate due to the inclination of the center line Ax1 of the hydrogen pump 20 relative to the travelling direction when the collision occurs, is the same as the direction in which the hydrogen pump 20 is likely to rotate due to the shifting of the center of gravity $C_{GLS}$ of the fastening portion 31 from the center of gravity $C_{HP}$ of the hydrogen pump 20 in the width direction of the fuel cell vehicle when the collision occurs. Thus, the rotation of the hydrogen pump 20, as a result of the collision of the fuel cell vehicle, may be further facilitated, and the direction of the movement of the hydrogen pump 20 in the backward travelling direction may be expected to be more effectively changed when the collision occurs. As a result, the deformation of the dash panel 40 due to the collision between the hydrogen pump 20 and the dash panel 40 may be more effectively prevented or alleviated.

Note that the straight line L3 between the center of gravity $C_{GLS}$ of the fastening portion 31 and the center of gravity $C_{HP}$ of the hydrogen pump 20, and the rotation axis of the motor of the hydrogen pump 20 may be inclined toward different sides relative to the travelling direction in the fuel cell vehicle as viewed in the vertical direction, as long as the rotation of the hydrogen pump 20 may be facilitated when the collision occurs, with the center of gravity $C_{GLS}$ of the fastening portion 31 shifted from the center of gravity $C_{HP}$ of the hydrogen pump 20 in the width direction of the fuel cell vehicle.

C. Third Embodiment

In the first and the second embodiments, the hydrogen pump 20 has a lower surface provided with the fastening portion 31. However, this configuration may be modified. For example, when the fastening portion 31 includes one or a plurality of fastening positions 32, the fastening position 32 may at least partially be provided on a surface other than the lower surface of the hydrogen pump 20 such as at least one side surface for example. One example of such a configuration is described below as a third embodiment.

Figure 5A:
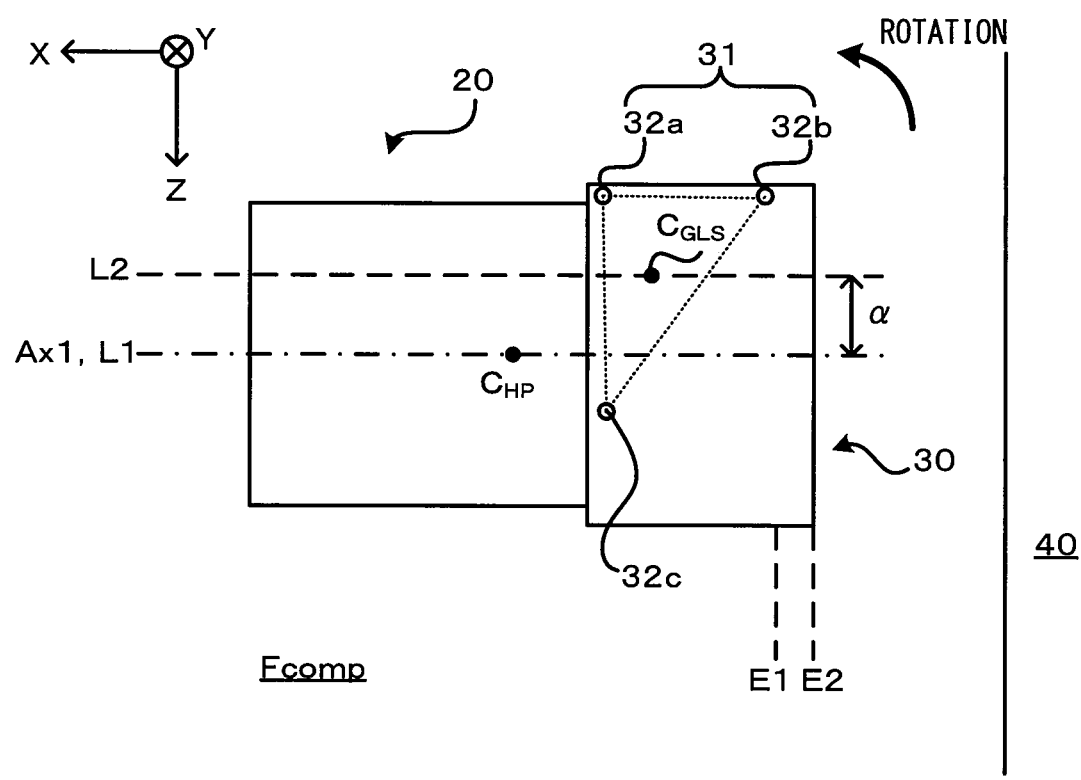
FIG. 5A is a diagram illustrating positional relationship between the center of gravity of a fastening portion and the center of gravity of the hydrogen pump.
Figure 5B:
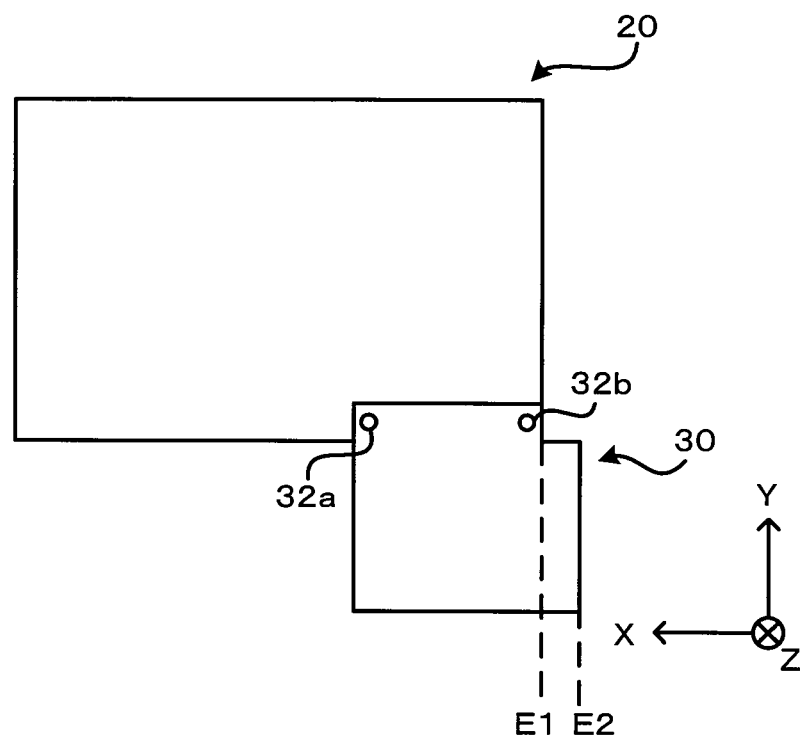
FIG. 5B is a left side view illustrating how the hydrogen pump and the gas-liquid separator are arranged.

FIG. 5A and FIG. 5B are inner views of the front compartment (Fcomp) of a fuel cell vehicle according to the third embodiment. FIG. 5A illustrates positional relationship between the center of gravity $C_{HP}$ of the hydrogen pump 20 and the center of gravity $C_{GLS}$ of the fastening portion 31 at which the hydrogen pump 20 and the gas-liquid separator 30 are fastened to each other in the fuel cell vehicle as viewed from the lower side in the vertical direction, as in FIG. 2. FIG. 5B is an inner view of the front compartment illustrating the arrangement of the hydrogen pump 20 and the gas-liquid separator 30 as viewed from the left side of the fuel cell vehicle. In FIG. 5A and FIG. 5B, the shape of each of the hydrogen pump 20 and the gas-liquid separator 30 is schematically illustrated as a rectangle. The fuel cell vehicle according to the third embodiment has a configuration that is similar to that of the fuel cell vehicle according to the first embodiment. Components that are the same as those in the first embodiment are denoted with the same reference numerals and will not be elaborated upon here.

In the third embodiment, the gas-liquid separator 30 is arranged below the hydrogen pump 20 to have the end portion, on the backward side in the travelling direction of the vehicle, disposed more on the backward side than the end portion of the hydrogen pump 20 on the backward side in the travelling direction (the straight line E2 is disposed more on the backward side than the straight line E1). The fastening portion 31 includes three fastening positions 32a to 32c. Two fastening positions 32a and 32b of the three fastening positions 32a to 32c are provided on a side surface of the hydrogen pump 20 as illustrated in FIG. 5B. As illustrated in FIG. 5A, the center of gravity $C_{GLS}$ of the fastening portion 31 is shifted from the center of gravity $C_{HP}$ of the hydrogen pump 20 in the width direction of the fuel cell vehicle (by a shifted amount a) in the fuel cell vehicle as viewed in the vertical direction. Also with this configuration, an effect similar to that obtained in the first embodiment may be obtained. In FIG. 5A and FIG. 5B, the center line Ax1 of the hydrogen pump 20 is in parallel with the travelling direction of the fuel cell vehicle. Alternatively, the center line Ax1 may be inclined relative to the travelling direction of the fuel cell vehicle as in the second embodiment.

D. Fourth Embodiment

In the first to the third embodiments, the gas-liquid separator 30 is provided below the hydrogen pump 20. However, this configuration may be modified. For example, the gas-liquid separator 30 may be provided and fastened to a side surface of the hydrogen pump 20. An example of this configuration is described below as a fourth embodiment.

FIG. 6 illustrates positional relationship between the center of gravity $C_{HP}$ of the hydrogen pump 20 and the center of gravity $C_{GLS}$ of the fastening portion 31 at which the hydrogen pump 20 and the gas-liquid separator 30 are fastened to each other in a fuel cell vehicle according to the fourth embodiment as viewed from the lower side in the vertical direction. In FIG. 6, the shape of each of the hydrogen pump 20 and the gas-liquid separator 30 is schematically illustrated as a rectangle. The fuel cell vehicle according to the fourth embodiment has a configuration that is similar to that of the fuel cell vehicle according to the first embodiment. Components that are the same as those in the first embodiment are denoted with the same reference numerals and will not be elaborated upon here.

In the fourth embodiment, the gas-liquid separator 30 is provided to be in contact with the left side surface of the hydrogen pump 20 to have the end portion, on the backward side in the travelling direction of the vehicle, disposed more on the backward side than the end portion of the hydrogen pump 20 on the backward side in the travelling direction (the straight line E2 is disposed more on the backward side than the straight line E1). The fastening portion 31 including the plurality of fastening positions 32, for attaching the gas-liquid separator 30 to the hydrogen pump 20, is provided to the left side surface of the hydrogen pump 20. In the fuel cell vehicle with this configuration, the center of gravity $C_{GLS}$ of the fastening portion 31 is positioned at the center of a line between the fastening position 32a and the fastening position 32b that are respectively the forward most one and the backward most one of the fastening positions 32 provided to left side surface of the hydrogen pump 20, in the fuel cell vehicle as viewed in the vertical direction. As illustrated in FIG. 6, the center of gravity $C_{GLS}$ of the fastening portion 31 is shifted from the center of gravity $C_{HP}$ of the hydrogen pump 20 in the width direction of the fuel cell vehicle (by a shifted amount a) in the fuel cell vehicle as viewed in the vertical direction. Also with this configuration, an effect similar to that obtained in the first embodiment may be obtained. In FIG. 6, the center line Ax1 of the hydrogen pump 20 is in parallel with the travelling direction of the fuel cell vehicle. Alternatively, the center line Ax1 may be inclined relative to the travelling direction of the fuel cell vehicle as in the second embodiment.

The gas-liquid separator 30, which is provided to a side surface of the hydrogen pump 20 as in the fourth embodiment, may also be provided to the upper surface of the hydrogen pump 20. In this configuration, the fastening portion 31 may be provided on the upper surface of the hydrogen pump 20. Still, the gas-liquid separator 30 may be provided below the hydrogen pump 20 as in the first to the third embodiments. The gas-liquid separator 30 provided below the hydrogen pump 20 partially overlaps with the hydrogen pump 20 in the vertical direction. This configuration facilitates an attempt to ensure a longer distance between the gas-liquid separator 30 and the dash panel 40. Thus, the hydrogen pump 20 integrated with the gas-liquid separator 30 by fastening may be prevented from colliding with the dash panel 40 at the time of vehicle collision. The gas-liquid separator 30 utilizes the gravity to remove water from the fuel gas, and thus may more easily and efficiently remove water from the fuel gas by being provided below the hydrogen pump 20.

E. Fifth Embodiment

The hydrogen pump 20 integrated with the gas-liquid separator 30 by fastening may be arranged at any position, in the width direction of the vehicle, in the front compartment. Still, the center of gravity $C_{GLS}$ of the fastening portion 31 may be provided on the same side, relative to the center line of the fuel cell vehicle in parallel with the travelling direction of the fuel cell vehicle, as the center of gravity $C_{HP}$ of the hydrogen pump 20, while being more separated from the center line than the center of gravity $C_{HP}$ of the hydrogen pump 20, in the fuel cell vehicle as viewed in the vertical direction. An example of this configuration is described below as a fifth embodiment.

Figure 7:
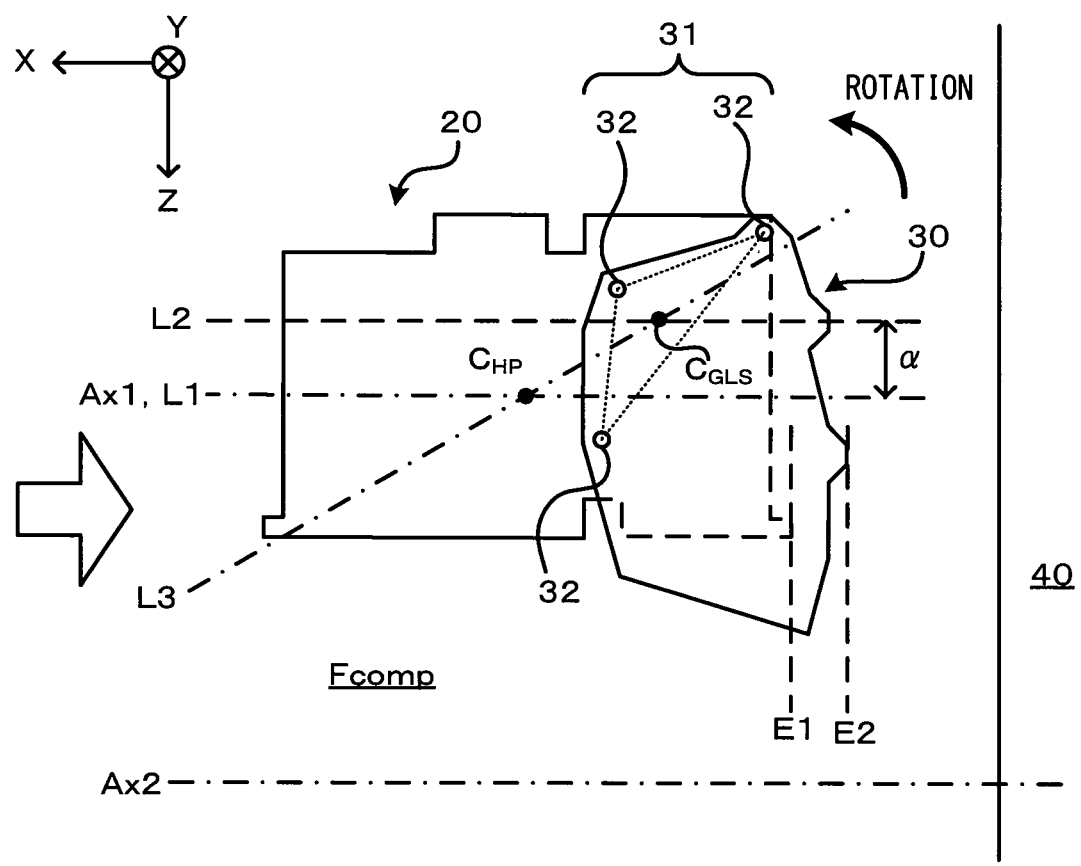
FIG. 7 is an inner view of the front compartment as viewed from a lower side.

FIG. 7 is a diagram illustrating the positional relationship between the hydrogen pump 20 and the gas-liquid separator 30 in the front compartment (Fcomp) in a fuel cell vehicle according to a fifth embodiment as viewed from the lower side in the vertical direction, as in FIG. 2. The positional relationship between the hydrogen pump 20 and the gas-liquid separator 30 in the fuel cell vehicle according to the fifth embodiment is the same as that in the fuel cell vehicle according to the first embodiment. Components that are the same as those in the first embodiment are denoted with the same reference numerals, and will not be elaborated upon here. In FIG. 7, a center line Ax2 represents the center line of the fuel cell vehicle in parallel with the travelling direction of the fuel cell vehicle.

As illustrated in FIG. 7, in the present embodiment, the hydrogen pump 20 and the gas-liquid separator 30 are on one side (for example, on left side) of the center line Ax2 of the vehicle while being separated from the center line Ax2. Thus, the center of gravity $C_{GLS}$ of the fastening portion 31 is on the same side, relative to the center line Ax2 of the fuel cell vehicle, as the center of gravity $C_{HP}$ of the hydrogen pump 20, in the fuel cell vehicle as viewed in the vertical direction. The center of gravity $C_{GLS}$ of the fastening portion 31 is more separated from the center line Ax2 of the fuel cell vehicle than the center of gravity $C_{HP}$ of the hydrogen pump 20 (with the shifted amount a between the center of gravity $C_{GLS}$ of the fastening portion 31 and the center of gravity $C_{HP}$ of the hydrogen pump 20 in the width direction).

With this configuration, when the vehicle collision occurs, the hydrogen pump 20 rotating, as in the first embodiment, is likely to move in a direction (for example, left side direction) away from the center line Ax2 of the fuel cell vehicle. When various devices are arranged in the front compartment, generally, a relatively large device is arranged around the center and smaller devices are arranged in the periphery of the large device. Thus, a space for arranging the relatively large device is ensured. Thus, in a peripheral portion separated from the front compartment, a gap may be easily provided between the relatively small devices. Thus, in the configuration where the hydrogen pump 20 and the gas-liquid separator 30 are arranged in front of the dash panel 40, the hydrogen pump 20 is likely to move away from the center line Ax2 of the fuel cell when the vehicle collision occurs. This facilitates an attempt to ensure the space to be the destination of the hydrogen pump 20 rotated to have the movement direction changed. As a result, the hydrogen pump 20 may be more effectively prevented from colliding with the dash panel 40. The same effects may be obtained with the positional relationship between the center line Ax2 of the fuel cell vehicle and the hydrogen pump 20 and the gas-liquid separator 30 applied to any one of the second to the fourth embodiments, instead of the first embodiment.

F. Sixth Embodiment

Various devices, other than the hydrogen pump 20 and the gas-liquid separator 30, may be arranged in the front compartment (Fcomp) of the fuel cell vehicle. A specific configuration in which the front compartment further accommodates an air compressor 52 and the fuel cell 50 is described below as a sixth embodiment.

Figure 8:
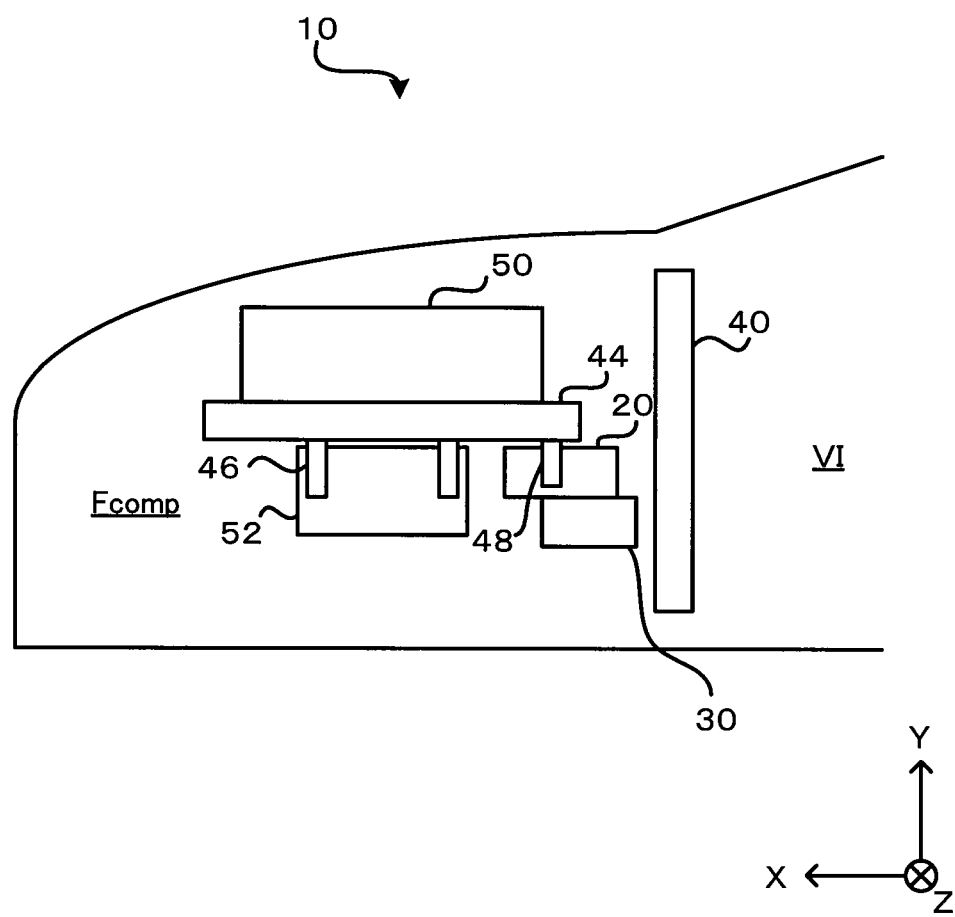
FIG. 8 is an inner view of the front compartment as viewed from a left side.

FIG. 8 is an inner view of the front compartment (Fcomp) of a fuel cell vehicle 10 according to the sixth embodiment of the present disclosure, as viewed from the left side. FIG. 9 is an inner view of the front compartment of the fuel cell vehicle 10 as viewed from the lower side in the vertical direction of the fuel cell vehicle 10. Various devices are arranged in the front compartment. Still, only the fuel cell 50, the air compressor 52, the hydrogen pump 20, and the gas-liquid separator 30 are illustrated in FIG. 8, and other devices are omitted in the figure. In FIG. 9, only the air compressor 52, the hydrogen pump 20, and the gas-liquid separator 30 are illustrated.

In FIG. 8 and FIG. 9, the shape of each of the hydrogen pump 20 and the gas-liquid separator 30 is schematically illustrated as a rectangle. In the fuel cell vehicle according to the sixth embodiment, the configurations and the arrangement of (positional relationship between) the hydrogen pump 20 and the gas-liquid separator 30 are the same as those in the first embodiment illustrated in FIG. 2. Alternatively, the configurations and the arrangement of the hydrogen pump 20 and the gas-liquid separator 30 in any of the second to the fourth embodiments may be employed in this configuration.

In the devices arranged in the front compartment, the fuel cell 50 and the air compressor 52 are arranged in a center portion of the front compartment. As illustrated in FIG. 8, the fuel cell 50 is placed on and attached to the upper side of a stack frame 44 extending in the travelling direction (X direction) of the vehicle. The stack frame 44 is a metal frame member with high rigidity, and is attached to a vehicle body via a mount (not illustrated), in the front compartment. At least a part of the devices in the front compartment, such as the fuel cell 50, is attached to the stack frame 44 to be fixed inside the front compartment.

The air compressor 52, the hydrogen pump 20, and the gas-liquid separator 30 are arranged on and attached to the lower side of the stack frame 44. The hydrogen pump 20 and the gas-liquid separator 30 are disposed more on the backward side than the air compressor 52 in the travelling direction (position closer to the dash panel 40), on the lower side of the stack frame 44. The air compressor 52 is attached to the stack frame 44 via a bracket 46. The hydrogen pump 20 is attached to the stack frame 44 via a bracket 48.

In the present embodiment, the fuel cell 50 is arranged in the front compartment, and the air compressor 52 and the hydrogen pump 20 are arranged close to the fuel cell 50 in the front compartment. This arrangement enables the fuel cell 50 and the air compressor 52 or the hydrogen pump 20 to be connected with each other through a short pipe, involving a smaller pressure loss. The smaller pressure loss is more effective for reducing the power consumption of the hydrogen pump 20 to be provided to a pipe for fuel gas with low gas pressure.

In the fuel cell vehicle according to the present embodiment, the hydrogen pump 20 and the gas-liquid separator 30 are arranged in a manner that is similar to that in the first and the fifth embodiment as described above. Thus, when the vehicle collision occurs, the hydrogen pump 20 rotates, due to the reaction applied thereto via the gas-liquid separator 30, to have the movement direction toward the backward side in the travelling direction changed, as in the first and the fifth embodiment.

In the present embodiment, the hydrogen pump 20 is attached to the stack frame 44 via the bracket 48 as described above (see FIG. 1). The force for fixing the hydrogen pump 20 to the stack frame 44 via the bracket 48 is smaller than that for fixing the hydrogen pump 20 and the gas-liquid separator 30, directly fastened to each other, to each other. Thus, when the vehicle collides, the hydrogen pump 20 and the gas-liquid separator 30 integrally move, but the hydrogen pump 20 may be relatively easily detached from the stack frame 44. Thus, when the vehicle collision occurs, the hydrogen pump 20 is released from the stacked frame 44, and thus may rotate as described above. Strength for attaching the hydrogen pump 20 via the bracket 48 may be appropriately set to enable the hydrogen pump 20 to rotate when the collision occurs as described above.

In the present embodiment, the hydrogen pump 20 is attached to the stack frame 44 via the bracket 48. However, this configuration may be modified. Specifically, any configuration with the hydrogen pump 20 directly or indirectly fixed to the vehicle body, in the front compartment, may be employed as long as components are fixed with force for fixing the hydrogen pump 20 and the gas-liquid separator 30 to each other being larger than force for fixing the hydrogen pump 20 in the front compartment. With this configuration, the hydrogen pump 20 fixed in the front compartment may be rotated by the reaction produced due to the collision as described above.

In the fuel cell vehicle according to the present embodiment having the configuration described above, the air compressor 52 is arranged in front of the hydrogen pump 20 and the gas-liquid separator 30, and is positioned to overlap with the hydrogen pump 20 in the travelling direction. Generally, the air compressor 52 is larger than the hydrogen pump 20, and includes a motor or the like and a metal casing that accommodates the motor or the like to be heavier than the hydrogen pump 20. Thus, when the collision occurs, the air compressor 52 that is relatively heavy might collide with the hydrogen pump 20 to increase the impact applied from the hydrogen pump 20 to the dash panel 40. In such a configuration where a relatively heavy device, such as the air compressor 52, is arranged in front of the hydrogen pump 20, the effect of reducing the impact applied to the dash panel 40, due to the collision, by rotating the hydrogen pump 20 is particularly advantageous.

At least one of the fuel cell 50 and the air compressor 52 may be arranged outside the front compartment. The deformation of the dash panel 40, due to the collision between the hydrogen pump 20 and the dash panel 40, may be prevented or reduced as long as the hydrogen pump 20 and the gas-liquid separator 30 are arranged in the front compartment with the positional relationship described above.

The disclosure is not limited to the embodiment and the modifications described above but may be implemented by a diversity of other configurations without departing from the scope of the disclosure. For example, the technical features of any of the above embodiment and its modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof. For example, the present disclosure may be implemented as the following aspects.

(1) In an aspect of the technique disclosed herein, there is provided a fuel cell vehicle equipped with a fuel cell. The fuel cell vehicle comprises a hydrogen pump provided to a pipe through which fuel gas including hydrogen is supplied to an anode of the fuel cell in a front compartment separated from a cabin by a dash panel; and a gas-liquid separator configured to be fastened to the hydrogen pump and remove water from the fuel gas flowing through the pipe, the gas-liquid separator having an end portion on a backward side in a travelling direction of the fuel cell vehicle arranged more on the backward side than an end portion of the hydrogen pump on the backward side in the travelling direction in the front compartment. A fastening portion, at which the hydrogen pump and the gas-liquid separator are fastened to each other, has a center of gravity shifted from a center of gravity of the hydrogen pump in a width direction of the fuel cell vehicle, in the fuel cell vehicle as viewed in a vertical direction.

The fuel cell vehicle according to this aspect having the hydrogen pump accommodated in the front compartment may prevent or alleviate the deformation of the dash panel due to the collision between the hydrogen pump and the dash panel, with the direction of movement of the hydrogen pump toward the backward side in the travelling direction changed, when the vehicle collision occurs.

(2) In the fuel cell vehicle according to the above-described aspect, the hydrogen pump may have a rotation axis of a motor of the hydrogen pump, the rotation axis being inclined relative to the travelling direction in the fuel cell vehicle as viewed in the vertical direction, and a straight line between the center of gravity of the fastening portion and the center of gravity of the hydrogen pump and the rotation axis of the motor may be inclined toward same side relative to the travelling direction, in the fuel cell vehicle as viewed in the vertical direction. The fuel cell vehicle according to this aspect may more effectively prevent or alleviate the deformation of the dash panel due to the collision between the hydrogen pump and the dash panel, with the direction of movement of the hydrogen pump toward the backward side in the travelling direction more effectively changed, when the vehicle collision occurs.

(3) In the fuel cell vehicle according to the above-described aspect, the center of gravity of the fastening portion and the center of gravity of the hydrogen pump may be on same side relative to a center line in parallel with the travelling direction of the fuel cell vehicle, in the fuel cell vehicle as viewed in the vertical direction, and the center of gravity of the fastening portion may be more separated from the center line than the center of gravity of the hydrogen pump. In the fuel cell vehicle according to this aspect, the movement direction of the hydrogen pump toward the backward side in the travelling direction is changed, when the vehicle collision occurs, in such a manner that the hydrogen pump is likely to move in a direction away from the center line of the fuel cell vehicle. This facilitates an attempt to ensure the space to be the destination of the hydrogen pump, so that the collision between the hydrogen pump and the dash panel may be more effectively prevented or alleviated.

(4) In the fuel cell vehicle according to the above-described aspect, the fastening portion may include a plurality of fastening positions at which the hydrogen pump and the gas-liquid separator are fastened to each other, and the center of gravity of the fastening portion may be a center of gravity of a figure obtained by connecting the plurality of fastening positions, in the fuel cell vehicle as viewed in the vertical direction. The fuel cell vehicle according to this aspect may prevent or alleviate the deformation of the dash panel due to the collision between the hydrogen pump and the dash panel, while ensuring tight and stable fastening between the hydrogen pump and the gas-liquid separator.

(5) In the fuel cell vehicle according to the above-described aspect, the gas-liquid separator may be disposed below the hydrogen pump. With the fuel cell vehicle according to this aspect, a long distance between the gas-liquid separator and the dash panel may be more easily ensured. Thus, a risk of collision between the hydrogen pump, integrated with the gas-liquid separator through fastening, and the dash panel may be reduced, when the vehicle collision occurs.

(6) In the fuel cell vehicle according to the above-described aspect, the front compartment may further accommodate the fuel cell; and an air compressor configured to supply air as oxidizing gas to a cathode of the fuel cell, and the air compressor may be positioned to overlap with the hydrogen pump in the travelling direction of the fuel cell vehicle and to be more on a forward side than the hydrogen pump in the travelling direction of the fuel cell vehicle. The fuel cell vehicle according to this aspect has the air compressor that is relatively heavy disposed in front of the hydrogen pump, and thus the collision between the hydrogen pump and the dash panel might involve larger impact. Thus, the effect of changing the movement direction of the hydrogen pump toward the backward side in the travelling direction is particularly advantageous in this fuel cell vehicle.

The present disclosure may be implemented in various modes other than the fuel cell vehicle. For example, the present disclosure may be implemented as a mode of a method for arranging a hydrogen pump and a gas-liquid separator in a fuel cell vehicle.

What is claimed is:

1. A fuel cell vehicle equipped with a fuel cell, comprising:
    a hydrogen pump provided to a pipe through which fuel gas including hydrogen is supplied to an anode of the fuel cell in a front compartment separated from a cabin by a dash panel, and
    a gas-liquid separator in the front compartment configured to be fastened to the hydrogen pump and remove water from the fuel gas flowing through the pipe, the gas-liquid separator having an end portion on a backward side in a travelling direction of the fuel cell vehicle arranged more on the backward side than an end portion of the hydrogen pump on the backward side in the travelling direction, wherein
    a fastening portion, at which the hydrogen pump and the gas-liquid separator are fastened to each other, has a center of gravity shifted from a center of gravity of the hydrogen pump in a width direction of the fuel cell vehicle, in the fuel cell vehicle as viewed in a vertical direction.

2. The fuel cell vehicle according to claim 1, wherein
    the hydrogen pump has a rotation axis of a motor of the hydrogen pump, the rotation axis being inclined relative to the travelling direction in the fuel cell vehicle as viewed in the vertical direction, and
    a straight line between the center of gravity of the fastening portion and the center of gravity of the hydrogen pump, and the rotation axis of the motor are inclined toward same side relative to the travelling direction, in the fuel cell vehicle as viewed in the vertical direction.

3. The fuel cell vehicle according to claim 1, wherein
    the center of gravity of the fastening portion and the center of gravity of the hydrogen pump are on same side relative to a center line in parallel with the travelling direction of the fuel cell vehicle, in the fuel cell vehicle as viewed in the vertical direction, and
    the center of gravity of the fastening portion is more separated from the center line than the center of gravity of the hydrogen pump.

4. The fuel cell vehicle according to claim 1, wherein
    the fastening portion includes a plurality of fastening positions at which the hydrogen pump and the gas-liquid separator are fastened to each other, and
    the center of gravity of the fastening portion is a center of gravity of a figure obtained by connecting the plurality of fastening positions, in the fuel cell vehicle as viewed in the vertical direction.

5. The fuel cell vehicle according to claim 1, wherein
    the gas-liquid separator is disposed below the hydrogen pump.

6. The fuel cell vehicle according to claim 1, wherein
    the front compartment further accommodates the fuel cell and an air compressor configured to supply air as oxidizing gas to a cathode of the fuel cell, and
    the air compressor is positioned to overlap with the hydrogen pump in the travelling direction of the fuel cell vehicle and to be more on a forward side than the hydrogen pump in the travelling direction of the fuel cell vehicle.

* * * * *